US005676105A

United States Patent [19]

Schwaderlapp et al.

[11] Patent Number: 5,676,105

[45] Date of Patent: Oct. 14, 1997

[54] INTERNAL COMBUSTION ENGINE WITH REINFORCED ENGINE BLOCK

[75] Inventors: Markus Schwaderlapp, Stolberg; Christian Schoenherr; Thomas Wagner, both of Aachen, all of Germany

[73] Assignee: FEV Motorentechnik GmbH & Co. Kommanditgesellschaft, Aachen, Germany

[21] Appl. No.: 501,059

[22] PCT Filed: Dec. 9, 1994

[86] PCT No.: PCT/EP94/04099

§ 371 Date: Oct. 4, 1995

§ 102(e) Date: Oct. 4, 1995

[87] PCT Pub. No.: WO95/16121

PCT Pub. Date: Jun. 15, 1995

[30] Foreign Application Priority Data

Dec. 22, 1993 [DE] Germany ............................ 9319054 U

[51] Int. Cl.$^6$ ................................ F02F 7/00; F02F 1/00; F01B 31/00; F16M 1/021

[52] U.S. Cl. ........................................................ 123/195 H

[58] Field of Search ............................ 123/193.2, 195 R, 123/195 A, 195 H

[56] References Cited

U.S. PATENT DOCUMENTS

| | | | |
|---|---|---|---|
| 3,817,354 | 6/1974 | Meiners . | |
| 4,454,842 | 6/1984 | Ogawa | 123/195 H |
| 4,465,041 | 8/1984 | Hayashi | 123/195 H |
| 4,466,401 | 8/1984 | Ogawa et al. | 123/195 H |
| 4,467,755 | 8/1984 | Hayashi | 123/195 H |
| 4,473,042 | 9/1984 | Kikuchi | 123/195 H |
| 5,107,809 | 4/1992 | Suh | 123/195 H |
| 5,218,938 | 6/1993 | Miller et al. . | |
| 5,404,847 | 4/1995 | Han | 123/195 H |

FOREIGN PATENT DOCUMENTS

| | | |
|---|---|---|
| 0 052 818 | 11/1981 | European Pat. Off. . |
| 0 064 457 | 4/1982 | European Pat. Off. . |
| 28 49 613 | 5/1979 | Germany . |
| 28 01 431 | 6/1979 | Germany . |
| 3544215 | 6/1986 | Germany . |
| 40 17 139 | 12/1991 | Germany . |

*Primary Examiner*—Marguerite McMahon
*Attorney, Agent, or Firm*—Spencer & Frank

[57] ABSTRACT

A piston engine which includes an engine block composed of a base material. The engine which block has a cylinder block with at least one cylinder formed therein, a piston located in the cylinder, and a crankshaft connected to the piston and being mounted on crankshaft bearings disposed in a crankcase of the engine block. The engine further includes a plurality of reinforcing components connected to the walls of the engine block. The reinforcing components are composed of a component material that is different from the base material and has a higher modulus of elasticity than the base material.

18 Claims, 3 Drawing Sheets

INTERNAL COMBUSTION ENGINE WITH REINFORCED ENGINE BLOCK

BACKGROUND OF THE INVENTION

In operation, piston engines, in particular piston internal combustion engines, are excited to vibrate by the changing events in the cylinder chamber, such as the course of combustion, but also by mechanical influences; the vibrations are also radiated as noise at the surfaces of the piston engine in the form of airborne noise and/or are transmitted via the bearings of the piston engine into the substructure or the body in vehicles as structure-borne sound.

Abatement of noise emissions of this kind is sought, because of their disadvantageous effects on man and the environment. German Patent Disclosure DE-A-28 49 613 attempts to produce a noise shield by providing an elastic acoustical insulation enclosure, which is attached to the engine block of a piston internal combustion engine. Furthermore, German Patent Disclosure DE-A-28 01 431 suggests supporting the entire piston internal combustion engine in an outer tublike casing with the aid of support elements, which insulate structure-borne sound. A disadvantage of such an acoustical insulation measure is that it contains a large part of the machine and therefore hinders the installation of add-on parts and/or additional units, such as engine mounts, starter, generator, or gas supply lines and gas exhaust lines. In this connection, in many cases, it is impossible to prevent the breaching of acoustical insulation enclosures of this kind in order to install add-on parts of this kind and/or additional units, which reduces its effectiveness. Furthermore, acoustical insulation measures of this kind reduce the heat tolerance of a piston internal combustion engine.

On account of the above mentioned disadvantages, there have been attempts to combat noise propagation by seeking to prevent or at least to reduce the generation of noise. In addition to reducing sources of excitation, for example by optimizing the combustion process, it makes sense primarily to reduce the noise transmission and noise radiation at the surfaces of the piston engine. This is achieved by embodying the piston engine as rigidly as possible, particularly making it resistant to bending or torsionally rigid, especially in its thin-walled regions; the oscillatory faces are embodied to be as small and/or thick-walled as possible with regard to airborne noise radiation. Not only is there then an undesired increase in weight, particularly resulting from an increase in wall thickness, primarily in cast components, but increased casting defects such as bubbles or pores or the like also occur. That is why German Patent Disclosure DE-A-35 44 215 has already suggested improving the rigidity of the engine block as a whole with a system of reinforcement ribs on the side walls in the cylinder region. As a result, undesired casting defects can be prevented by embodying the ribs in this way, and high rigidity of the cylinder block can be achieved.

German Patent Disclosure DE-A-40 17 139 suggests the concept of achieving the required rigidity of the engine block via the purposeful installation of bands and ribs. According to this proposal, this is achieved in particular by binding the crankshaft bearings to the cylinder block and to the side walls of the crankcase via a multitude of reinforcing ribs, so that the rigidity of the engine block structure as a whole is increased. However, this entails a corresponding increase in weight. From an economical standpoint, a weight increase is to be avoided.

SUMMARY OF THE INVENTION

The object of the invention, now, is to reduce the vibration and noise generation of a piston engine, in particular of a piston internal combustion engine, by the configuration of the engine block structure; the overall weight must not be increased, if at all possible.

The object is attained according to the invention with a piston engine, in particular a piston internal combustion engine, in which cylinders, pistons, crankshaft, and crankshaft bearings are disposed in an engine block, and regions on the engine block are provided with cap- and/or cup-shaped coverings and in which the walls of the engine block and/or the coverings, are firmly connected, at least in some regions, with reinforcing components which are embodied of a component material that differs from the base material of the engine block and/or the coverings and that has a higher modulus of elasticity than the base material. The particular advantage of the attainment according to the invention is that materials can be chosen for the component material, which, in addition to having a much higher modulus of elasticity than the base material, have a lower density, depending upon the base material used. The achievement is thus that while the overall weight of the piston engine remains the same, the rigidity in the relevant regions is increased and/or the overall weight can even be reduced. In terms of the present invention, the coverings include, for example, the cylinder head cover, control drive coverings, the crankcase or oilpan, and similar elements of the engine structure. With a view to reducing noise, which is the present object, in particular in piston internal combustion engines, the transmissions connected to them also have to be taken into account, since even the walls of a flange mounted transmission case, for example, can radiate noise. Here, too, a vibration reducing reinforcement can be achieved with an arrangement of components in the wall. In the same manner, the intake and/or exhaust pipes can be reinforced in a vibration reducing manner on the inside with tubular components and/or on the outside with strut- or rib-shaped components, so that via these structures that in the broad sense belong to the engine block, no noise radiation or only slight noise radiation is produced.

In a preferred embodiment, ceramic materials, in particular oxide ceramic materials, are provided for the component material. These have a much higher modulus of elasticity than the standard gray cast iron or cast aluminum used for the base material. In the event that gray cast iron is used as the base material, the density of ceramic materials is essentially lower than the density of the base material. With the use of cast aluminum, the density of the ceramic materials is approximately the same. Because of these material properties, reinforcing components of ceramic materials, with the same mass, can produce approximately twelve times the rigidity compared to a structurally similar embodiment of gray cast iron. For the same rigidity, for example, ribs of a ceramic material have approximately 70% less mass than ribs of gray cast iron. A further advantage is that with a rib-shaped embodiment of such components, with a predetermined equal rigidity given the higher modulus of elasticity, the geometric dimensions are reduced compared to a rib of the base material, so that the structural volume of the engine is reduced. Reinforcing measures for noise reduction can therefore be effectively introduced into the components, even with an existing production system.

In an advantageous embodiment of the invention, it is further provided that the components are each at least partly enclosed by the base material, with a positive fit. In that case, in a practical embodiment of the invention, it is provided that the reinforcing components are connected to the base material by at least partial recasting with it. The particular advantage of recasting is that already during the casting process, the base material flows around the corresponding components, in particular ceramic components, which are held in the forms, so that greater dimensional tolerances on the part of the ceramic components can be accepted. This makes it possible to use ceramic components of this kind the way they come from the firing process, without any finishing. The ceramic components are held under compressive strain in the base material, since during the cooling phase, the base material contracts more intensely than the inserted ceramic components. This is particularly advantageous for brittle ceramic material.

In another advantageous embodiment of the invention, it is provided that the reinforcing components are firmly connected to the base material via auxiliary materials. Here, organic or inorganic glues come under consideration as the auxiliary materials, or soldering-on of the ceramic components by means of metallic or non-metallic solder, for example glass or enamel solder can be considered.

In an advantageous embodiment of the invention, it is further provided that in the region of the crankshaft bearings, the reinforcing components are embodied as strut-shaped and connect the bearing region with the wall of the engine block. This disposition is particularly effective since the installation space available here is definitely predetermined by the rotating counterweights connected to the crankshaft. A further increase in the rigidity of the bearing region through the connection of neighboring walls of the engine block via this kind of strut-shaped supports is therefore possible only through the use of materials with a higher modulus of elasticity than the base material used, in particular through the use of ceramic materials. As a result, the vibrations of the crankshaft bearing, which are critical for the transmission of structure-borne sound, are effectively suppressed both in the longitudinal direction of the engine and in the direction of the lateral engine axis and the vertical engine axis.

BRIEF DESCRIPTION OF THE DRAWINGS

The invention will be described in further detail in conjunction with schematic drawings of exemplary embodiments.

DETAILED DESCRIPTION OF THE INVENTION

Figure 1:
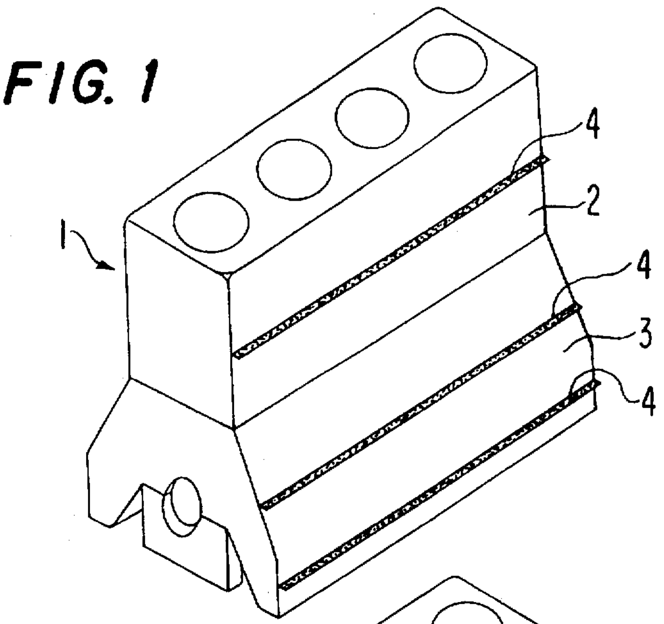
FIG. 1 shows an engine block of a piston internal combustion engine with reinforcing, rib-shaped components disposed in the longitudinal direction.

FIG. 1 shows an engine block 1 of a four-cylinder piston internal combustion engine whose upper section 2 constitutes the cylinder block and whose lower section 3 constitutes the upper part of the crankcase. The crankcase is enclosed on the underside with a tublike crankcase bottom (oil pan), not shown here. The cylinder block 2 and the crankcase 3 are embodied as one component, particularly in vehicle engines. To reinforce the structure, rib-shaped components 4, which extend in the longitudinal direction of the engine, are installed on the cylinder block 2 and likewise on the crankcase 3. These rib-shaped components 4 are comprised of a material which has a higher modulus of elasticity than the base material, preferably a ceramic material. If the engine block 1 is made for example of gray cast iron, then the components 4 have for example approximately three times higher a modulus of elasticity compared to the gray cast iron base material and about half the density of the base material. The thermal expansion coefficient is similar to that of gray cast iron so that a composite of gray cast iron and ceramic is not problematic from this standpoint. If aluminum is used as the base material, the components 4, for example with the use of aluminum oxide ceramic, have five times higher a modulus of elasticity than the base body at a similar density. Thus for example when gray cast iron is used for the base body, this kind of ceramic rib-shaped component 4, as shown in the drawing, has around 70% less mass than ribs of gray cast iron, with the same inherent stability. Rib-shaped components of this kind can be disposed on the crankcase 3, both on the outer wall and on the inner wall. In the apparatus shown, the rigidity of the engine block increases globally and above all locally, in particular with regard to the vertical engine axis, so that the production of vibrations is hindered and the amplitude of the vibrations produced by the engine block is decreased.

Figure 2:
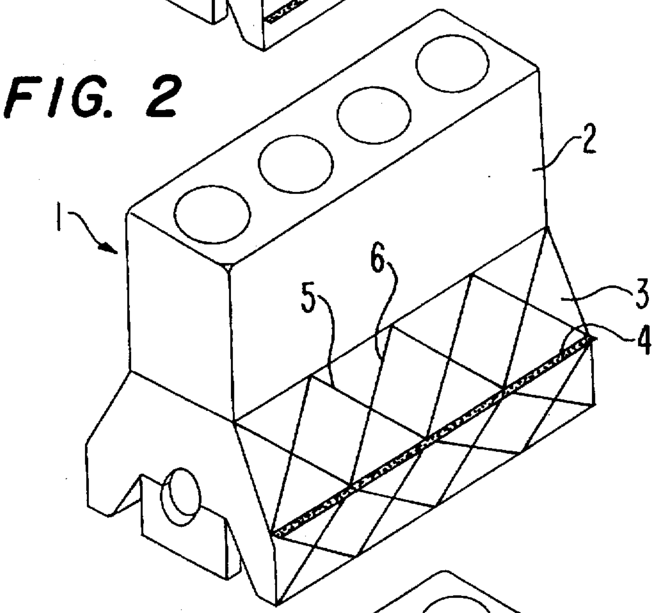
FIG. 2 shows an engine block with reinforcing components in the region of the crankcase.

FIG. 2 shows an engine block in which, next to a rib-shaped component 4 of oxide ceramic which extends in the longitudinal direction of the engine and which is intended to reinforce the crankcase wall, ribs 5 and 6 are disposed, which criss-cross one another and which can also be made of ceramic.

Figure 3:
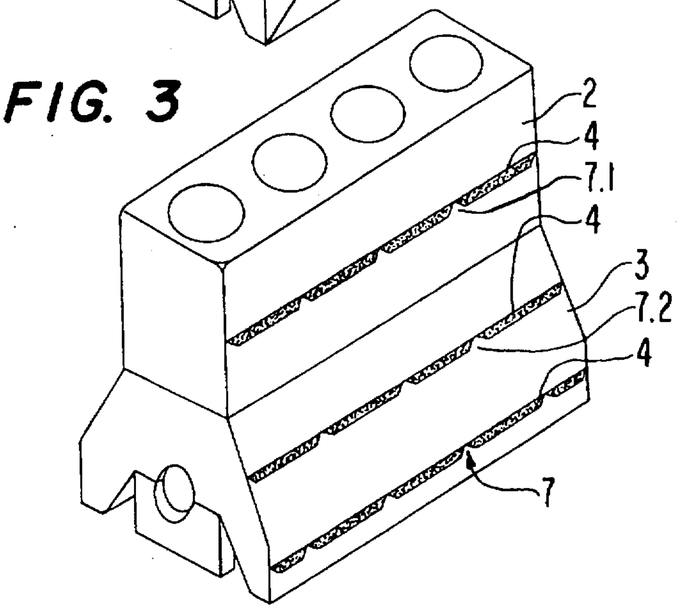
FIG. 3 shows a modification of the embodiment form according to FIG. 1.

FIG. 3 shows a modification of the form of embodiment according to FIG. 1. Here, the longitudinally extending rib-shaped components 4 are interrupted, i.e., segmented, in their longitudinal direction; the breaks are preferably provided in the region of the connecting points of the bearing walls with the outer walls of the engine block. By this means, the free oscillatory outer faces of the engine block structure are reduced in size, and the acoustic behavior of the engine block structure is audibly improved. Ribs of this kind lead to an increased impedance discontinuity at the break points 7 and consequently in particular to a reduction of the structure-borne sound transmission. The geometry of the break points can be embodied as wedge-shaped or trapezoidal, as shown for the region 7.1, or rounded, as shown for the region 7.2. This construction with short, segmented ribs takes into account the particular conditions of the brittle ceramic material. The construction with segmented ribs is also advantageous, however, in purely cast constructions.

Figure 4:
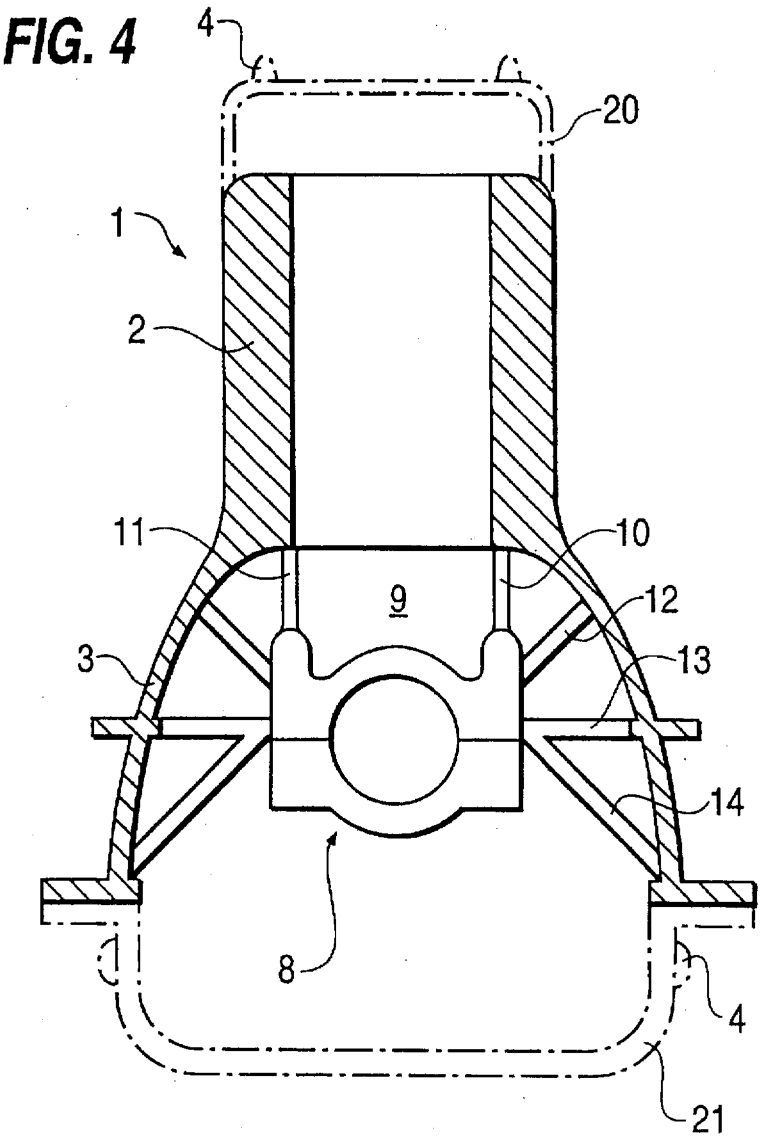
FIG. 4 shows a support of the crankshaft bearing on the crankcase via reinforcing, strut-shaped components.

FIG. 4 shows a vertical section through an engine block 1 in which the cylinder block 2 and the crankcase 3 are connected to each other in one piece. In this case, the support 8 for the main bearing is firmly connected to the engine block via a bearing wall 9, which is reinforced with ribs 10, 11, and is firmly connected to the wall of the crankcase 3 via additional strut-shaped ribs 12, 13, 14 so that an additional reinforcing is produced here. To increase the rigidity while at the same time reducing weight, it is provided that at least a part of the strut-shaped ribs 12, 13, and/or 14 is comprised of a ceramic material. Preferably the reinforcing ribs which are disposed perpendicular to the bearing wall 9 are either reinforced with ceramic material or are embodied entirely of ceramic material. As a result, the vibrations of the crankshaft bearing, which are critical for the transmission of structure-borne sound, are effectively suppressed both in the longitudinal direction of the engine and in the direction of the lateral engine axis and the vertical engine axis, and the input impedance at the main bearing is markedly increased. Moreover, this Figures shows the components 4 also being disposed on the coverings 20, 21.

Figure 5:
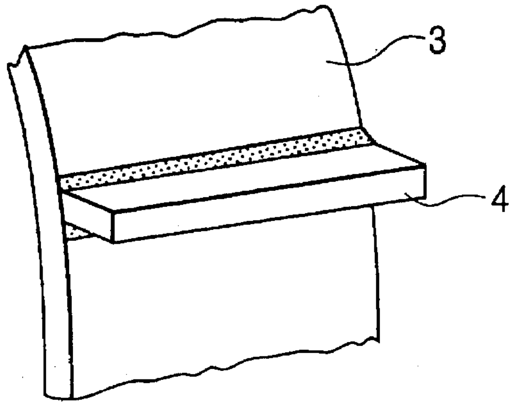
FIG. 5 shows a partial detail of an engine block wall with a subsequently installed reinforcing component.
Figure 9:
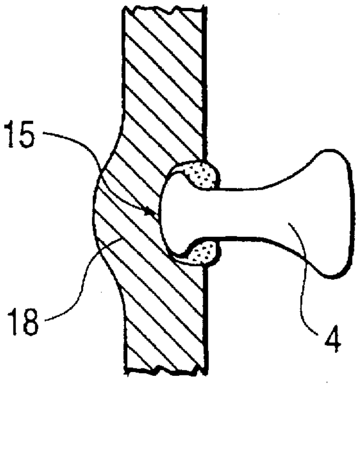
FIG. 9 shows the rib shape according to FIG. 8 in a soldered-in embodiment form.

FIG. 5 schematically represents a possibility of the connection of a rib-shaped component 4 to the wall of an engine block, for example with the wall of the crankcase 3. In this embodiment form, the component 4 is mounted subsequently on the crankcase 3; the connection is produced via an auxiliary material, for example a glue and/or by soldering or welding. In this connection, as FIG. 9 shows, it can be practical in manufacture to provide a channel-shaped recess in the wall of the engine block, into which recess the rib-shaped component 4 is inserted and attached to the corresponding wall region of the engine block by gluing, soldering, or welding.

Figure 6:
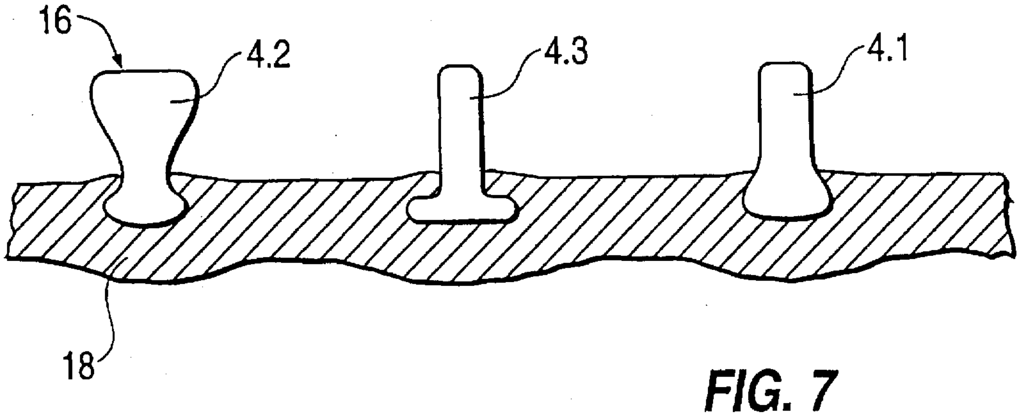
FIG. 6 shows a sectional representation of different exemplary embodiments for rib-shaped components cast integrally with the base material of the engine block.

As FIG. 6 shows, rib-shaped components 4 of this kind can already be introduced into the base material upon manufacture of the engine block by means of recasting a component of this kind. As the cross sectional form 4.1 shows, in this connection, the edge that is to be molded for the rib-shaped component has to be embodied as correspondingly thickened, and the thickening must be embodied as rounded, so that as a result, the stresses arising here become effective to a large extent in the form of compression of the surface of the component 4.1.

Figure 8:
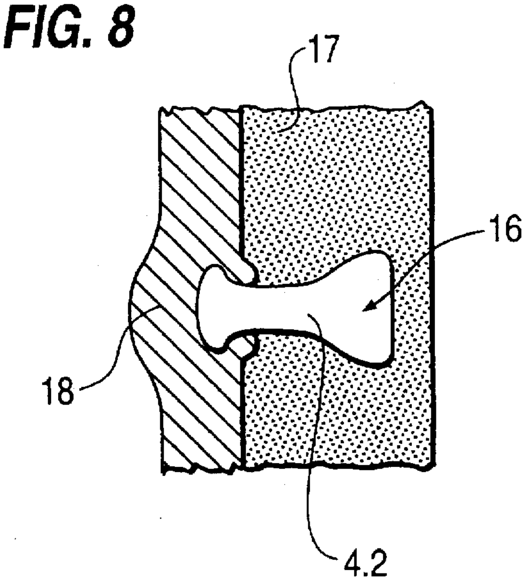
FIG. 8 shows a preferred embodiment form of an integrally cast rib.

In the cross sectional form as shown for the rib-shaped component 4.2, an increase in rigidity of the ribs is produced by the fact that the freely exposed edge 16 is embodied as correspondingly thickened, so that a higher geometrical moment of inertia is produced with regard to the wall to be reinforced of the internal combustion engine. A further advantage of this embodiment is that an outer edge 16, which is thickened in this way, simultaneously produces good fixing-in in the form material. As FIG. 8 shows, the thickened region is imbedded in the form material 17 of the casting form so that only the end which is to be enclosed by the base material of the engine block to be produced protrudes from it. In this connection, the casting form has to be provided such that if possible, the wall thickness in the recasting region 18 is essentially constant, so that a "recasting crease" is produced, which encloses the rib-shaped component 4.2 with positive fit like a "molly screw".

This kind of rib-shaped component 4.2 of ceramic material, though, can also be affixed directly to the model so that the form sand surrounds the ribs having positive fit. Here, the undercuts can be filled by an easily vaporizable material, e.g. by wax, in order to prevent the penetration of sand. In a similar manner, ceramic components of this kind can also be integrated in sand cores or metal forms (permanent mold casting, die casting). In the lost foam process, the rib-shaped components 4 are inserted directly into the positive made of foam material.

Furthermore, FIG. 6 shows a cross section of a rib-shaped component 4.3.

Figure 7:
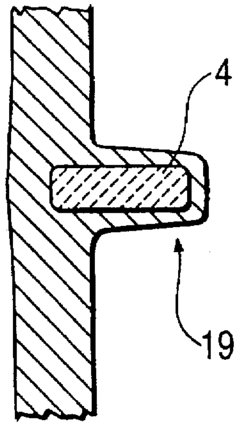
FIG. 7 shows a sectional representation of a rib-shaped ceramic component, which is completely enclosed by the base material.

The cross section according to FIG. 7 shows a rib-shaped reinforcement 19 in which a ceramic component 4 is completely enclosed by casting material. In this embodiment form, the complete enclosing is not provided over the entire length, since the component 4 of ceramic material to be recast must be fixed in the form, at least in its end regions.

In order to prevent so-called thermal shock when integrally casting components 4 of this kind, it is practical if the components 4 that are to be entirely or partially recast are heated immediately before casting. With electrically conductive ceramic materials, the preheating of the ceramic components in the sand form can be carried out inductively.

In the region of the cylinder block 2, the teaching according to the invention can be used not only by mounting ceramic components as shown in FIG. 1. In this region, it is also possible to dispose reinforcing components of ceramic material, for example cast integrally and suitably embodied, in the vicinity of the threaded vent, so that apart from the increase in rigidity with regard to dynamic stresses, an increase in rigidity with regard to static stresses is also produced. As a result, therefore, cylinder tube warping as a result of screwing forces can for example be minimized.

Oxide ceramic materials, in particular mixed ceramics or dispersion ceramics based for example on aluminum oxide, silicium oxide, or zirconium oxide and/or mixtures of these can be used as ceramic materials for the components. In addition to that, silicium nitrite ($Si_3$) or silicium carbide come under consideration, as well as FRC's (fiber reinforced ceramics) in general. The choice depends not only on the cost for these materials, but also on the stress involved.

We claim:

1. A piston engine comprising an engine block composed of a base material and having a cylinder block with at least one cylinder formed therein, a piston located in the cylinder, and a crankshaft connected to the piston and being mounted on crankshaft bearings disposed in a crankcase of the engine block, said engine comprising a plurality of reinforcing components connected to at least the walls of the cylinder block, said reinforcing components being composed of a material that is different from the base material and has a higher modulus of elasticity than the base material.

2. The piston engine defined in claim 1, wherein said reinforcing component comprises a ceramic material.

3. The piston engine defined in claim 1, wherein each of said reinforcing components is at least partly encased by the base material to form a positive fit therebetween.

4. The piston engine defined in claim 1, wherein each of said reinforcing components comprises a rib connected to a wall of the engine block to reinforce the engine block.

5. The piston engine defined in claim 1, wherein at least one of the reinforcing components comprises a strut connecting a crankshaft bearing region to a wall of the engine block.

6. The piston engine defined in claim 5, wherein said strut connects the crankshaft bearing region to a wall of the crankcase.

7. The piston engine defined in claim 1, wherein said reinforcing components are connected to the base material by being at least partially recast therewith.

8. The piston engine defined in claim 1, further comprising an auxiliary material connecting said reinforcing components with the base material.

9. The piston engine defined in claim 1, wherein said piston engine is an internal combustion engine.

10. A piston engine comprising an engine block having a cylinder block with at least one cylinder formed therein, a piston located in the cylinder, a crankshaft connected to the piston and being mounted on crankshaft bearings disposed in a crankcase of the engine block, and at least one covering composed of a base material and that covers a portion of the engine block, said engine further comprising a plurality of reinforcing components firmly connected to at least the walls of the covering, said reinforcing components being composed of a material that is different from the base material and that has a higher modulus of elasticity the base material.

11. The piston engine defined in claim 10, wherein said reinforcing component comprises a ceramic material.

12. The piston engine defined in claim 10, wherein each of said reinforcing components is at least partly encased by the base material to form a positive fit therebetween.

13. The piston engine defined in claim 10, wherein each of said reinforcing components comprises a rib connected to a wall of the covering to reinforce the covering.

14. The piston engine defined in claim 10, wherein said reinforcing components are connected to the base material by being at least partially recast therewith.

15. The piston engine defined in claim 10, further comprising an auxiliary material connecting said reinforcing components with the base material.

16. The piston engine defined in claim 10, wherein said piston engine comprises an internal combustion engine.

17. The piston engine defined in claim 10, wherein the covering has one of a cap shape and a cup shape.

18. The piston engine defined in claim 10, wherein the covering covers one of the crankcase and the cylinder block.

* * * * *